Patented Nov. 28, 1950

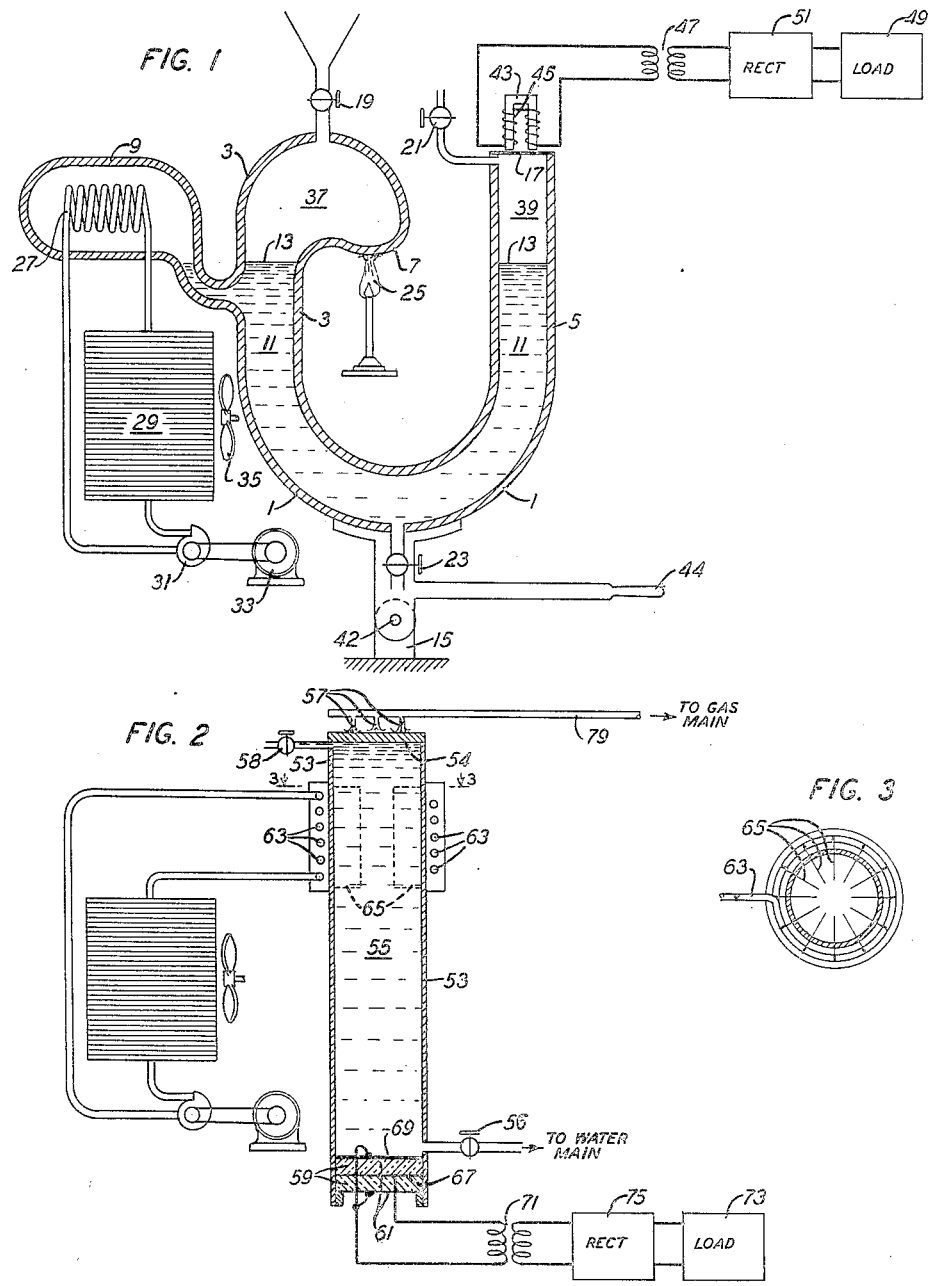

2,532,096

UNITED STATES PATENT OFFICE 2,532,096

POWER SOURCE

Ralph V. L. Hartley, Summit, N. J., assignor to Bell Telephone Laboratories, Incorporated, New York, N. Y., a corporation of New York Application March 16, 1946, Serial No. 655,000

5 Claims. (Cl. 60—25)

This invention relates to prime sources of energy and more particularly to a novel system for producing electrical energy in which a piezoelectric element, a magnetostrictive element or the like is excited by vibrations generated by the intermittent operation of a flash boiler.

An object of the invention is to produce electrical energy without the use of rotating parts or other conventional power generation apparatus.

Another object of the invention is to convert the energy of burning fuel into electrical energy with relatively little movement of mechanical masses.

Still another object of the invention is to convert the energy of steady heat or combustion into the energy of intermittent vaporization and in turn to convert the resulting oscillatory energy into alternating electrical energy.

In accordance with preferred embodiments of the invention a chamber, normally a closed one, is filled principally or entirely with a liquid which is vaporizable, such as water. Heat is supplied to vaporize a part of the liquid at one part of the chamber and heat is withdrawn from the vapor to condense a part of it, either at the same part of the chamber or at another part. By proper adjustment of the dimensions of the chamber in accordance with the principles hereinafter discussed, the vaporization and condensation of the liquid may be caused to take place intermittently, thus setting the liquid in the chamber into a state of oscillation either of the liquid body as a whole, or as movement within the chamber of the molecules of the liquid which carry waves of compression and rarefaction from one part of the chamber to another. These liquid oscillations give rise to periodic alterations of the pressure within the chamber and these, in turn, actuate a suitable mechanical-electrical transducing device such as a telephone receiver, a magnetostrictive element, or a piezoelectric element, whereby compression wave energy is converted into alternating electrical energy of the same frequency. For best results the natural frequency of the mechanical-electrical transducer is preferably chosen to coincide with the natural frequency of the compression wave which exists in the liquid chamber.

The invention will be more fully understood from the following detailed description of preferred embodiments thereof taken in conjunction with the drawings in which:

Fig. 1 is a schematic illustration of a system for converting heat energy into energy of mass movement of a liquid and for converting the latter, in turn, into electrical energy;

Fig. 2 is a schematic illustration of a system for converting heat energy into the vibratory energy of a water column and for converting the latter, in turn, to oscillatory electrical energy; and Fig. 3 is a cross-section of a part of Fig. 2 taken along the line 3—3.

In the specification and claims the term "oscillations" or its derivatives, where not otherwise understood from its context, will be understood as expressing the idea which is generic to both species although the terms "oscillations" and "vibrations," in their specific senses, are appropriate respectively to the Fig. 1 and Fig. 2 types of species.

Referring now to Fig. 1, a closed U-shaped tube 1 formed with a shallow dish-like portion 7 at the upper end of one branch 3 and a bulb 9 connecting with the same branch 3 somewhat below the dish 7, is filled with a vaporizable liquid 11 such as water up to the level indicated by the dotted line 13. In place of water any liquid with a definite boiling point may be employed. The tube 1 may be constructed of any suitable strong, liquid-tight and vapor-tight material, for example, steel, and preferably of a material which is capable of withstanding considerable pressures. The tube 1 should preferably have smooth inside walls. It may be suitably mounted on a stand 15 or supported in any other convenient manner.

The other branch 5 of the U tube 1 is terminated at its upper end by a flexible diaphragm 17 which may be sealed into place in any convenient manner. It should be capable of deflecting when subjected to internal or external pressures but should be capable of withstanding any pressure which may arise during the operation of the device without failure or rupture.

A stop-cock 19 is provided at the top of the first branch 3 of the tube for introducing the liquid, and an air vent 21 is provided near the top of the other branch 5 to permit the liquid 11 to adopt the desired level 13. Another stop-cock 23 is provided at the bend or lowest portion of the tube for draining the liquid.

As indicated in the figure, the lower bulb 9 in the left-hand branch 3 of the U tube 1 slopes upward away from the tube in such a manner that in the position shown, any liquid which may enter into or be formed in this bulb 9 will run back into the U tube 1.

A suitable source of heat, schematically indicated by a Bunsen burner flame 25 is applied to the dish 7 and suitable cooling means, for example, a cooling coil 27 whose circuit is closed through a cooling radiator 29 and a pump 31 driven by a motor 33 is contained in or otherwise closely coupled thermally to the lower bulb 9. The radiator 29 may be cooled by a fan 35 in accordance with conventional internal combustion engine practice.

The dish 7 may be termed the boiler and the bulb 9, with its associated cooling apparatus, may be termed the condenser.

The spaces 37, 39 of each branch of the tube 1 above the normal liquid level 13 contain air or other gas which may be under atmospheric pressure or under increased or reduced pressure as desired.

To start oscillations of the device, it may be shaken or tilted or otherwise disturbed (as by rocking it about the pivot 42, for which purpose a handle 44 is provided) until a few drops of the liquid 11 in the left-hand branch 3 find their way into the boiler 7. Because of the heat which is communicated to the boiler by the heat source 25 this liquid is immediately vaporized or "flashed" into steam, thus causing an immediate increase of pressure in the chamber 37. This tends to force the liquid 11 downward in the first branch 3, around through the U-shaped portion of the tube 1 and upward into the second branch 5, thus compressing the air or gas which is included in the chamber 39 and raising the liquid in the second branch 5 above the level of the liquid in the first branch 3. Because of the inertia of the water mass 11, it tends to swing beyond the point at which the gravitational and gas-pressure forces are equalized, and then, under the influence of the unbalanced gravitational and gas pressure restoring forces, to swing back again. Thus the water mass goes into oscillation, swinging backward and forward like a pendulum. Without the features to be described, however, due to friction between the liquid 11 and the inside walls of the tube 1, these oscillations would be damped out so that on the return swing, the water in the left branch 3 of the tube would not rise sufficiently high to spill over into the dish 7.

In accordance with the invention, however, it is possible to maintain sustained oscillations if on the first downward swing of the liquid 11 in the left-hand branch 3, the level of the water in that branch falls sufficiently low to permit some of the steam formed in the boiler to enter the condenser 9. As soon as it does so the steam comes in contact with the cooling coils 27 and is immediately condensed, thus greatly reducing the pressure in the upper chamber 37 (which now comprises the boiler 7 and the condenser 9 in communication) and so increasing the force which tends to swing the water mass 11 downward in the right-hand branch 5 and upward in the left. Thus on the return swing, the water mass 11 is given an impulse which is sufficient to bring it to a level high enough to spill over into the boiler dish 7. Thereupon the whole cycle is repeated, the liquid swinging back and forth from one branch 3 to the other 5 at a frequency dependent on the inertia of the liquid mass 11 and the compressibility of the gas in the upper chambers 37, 39 and with an amplitude depending on the volume of the vapor which is evaporated and condensed during each cycle. This, in turn, depends not only on the rate of heat transfer from the heat source 25 to the boiler 7 and the rate of removal of heat energy by condensation, but it also depends on the design of the boiler dish 7. That is, if the dish is sufficiently hot to evaporate its contents fully on each swing, then supplying heat at a greater rate does not increase the energy of oscillations but only the losses of the system. Therefore the volume of the boiler dish 7 sets an upper limit to the violence of the oscillations and prevents their reaching destructive proportions.

There has been described an engine in which the conversion of heat energy into oscillatory energy of motion of a liquid mass column is accomplished without the intermediary of any conventional apparatus such as rotating parts.

In accordance with a second aspect of the invention, energy of movement of the water mass is converted into electrical energy by the provision of a suitable mechanical-electrical transducer in a position where it will be excited by the oscillatory mechanical motion. Thus the diaphragm 17 which terminates the upper end of the right-hand branch 5 of the U tube 1 may be a metal diaphragm which is caused to move upward and downward (in the figure) as the pressure within the chamber 39 rises and falls above and below atmospheric pressure. This diaphragm 17, in turn, may be the armature of a magnet 43 provided with a winding 45. Movement of the diaphragm modifies the magnetic flux linking the winding 45, just as in the case of a conventional telephone receiver, and so produces alternating electrical energy which may be fed, for example, by way of a transformer 47 to any desired load 49. If direct current, as distinguished from alternating current is desired, a rectifier 51 may be included in the circuit.

Fig. 2 shows a modified system which is inherently adapted to the production of oscillations of much higher frequencies than are obtainable with the apparatus of Fig. 1. In this figure a vessel is provided which may be curved, if desired, but may just as well be a straight cylindrical column or tube 53. It is formed of rugged, pressure supporting material just as was the U tube of Fig. 1, but in this case, it is completely filled with water or other evaporable liquid 55. It is closed at its upper end by a heat-conducting plate 54 to which heat is applied by gas jets 57. A stop-cock 56 and an air vent 58 are provided for filling and draining the tube 53. The tube is provided at the lower end with a suitable mechanical electrical transducer shown in this figure for the purposes of illustration as a piezoelectric element 59. Cooling coils 63 surround the chamber wall near its upper end and cooling fins 65 which may be welded, soldered, or otherwise closely coupled to the cooling coils 63 for thermal conduction, project through the walls of the tube 53 into the liquid 55. They are preferably arranged to extend a short distance radially inward and run a short distance parallel with the axis of the tube 53 in a fashion to offer a minimum of interference to movements of the liquid particles therein.

When heat is applied to the upper plate 54 of this device as by the gas jet 57, and after the water as a whole is brought to a temperature close to the boiling point, bubbles of steam are formed at the upper surface of the water mass 55. The expanding steam gives a downward impulse to the column of water, and this impulse travels as a compression wave through the water to the far end of the tube 53, is there reflected at the face of the piezoelectric element 59, and travels back again to the upper end. Meantime, some of the steam initially formed will have been condensed by even a minute withdrawal or separation of the upper water surface from the hot plate 54, and consequent movement nearer to the cooling fins 65. As the compression wave returns to the upper end of the tube, the remainder of the steam is condensed by the pressure of the upwardly advancing compression wave, and the upper water surface is again forced into contact with the hot plate 54, whereupon more steam is formed and the cycle is repeated.

With good reflection of the traveling compression wave at each end of the tube, standing compression waves are formed, the length of the tube being a half wavelength or a multiple of a half wavelength. Inasmuch as the speed of propagation of a traveling wave in water is about 5,000 feet per second, a tube six inches in length, or half a wavelength long, will support oscillations of a frequency of approximately 5,000 cycles per second.

To convert the energy of the standing compression waves in the liquid 55 into electrical energy, any suitable mechanical electrical transducer may be employed, although for the high pressures and high frequencies involved, a piezoelectric element, such as the organization made up of the piezoelectric crystal plates 59 is particularly well suited. Thus the tube of Fig. 2 may be terminated at its lower end by a crystal arranged to oscillate in its fundamental flexure mode. The latter may be a composite assembly of piezoelectric materials and electrodes, oriented and juxtaposed to respond to flexural vibrations. Such an assembly is termed a bimorth. It may take various forms, many of which, including electrode arrangements therefor, are shown and described in United States patent to Sawyer 2,105,010, January 11, 1938. A simple and suitable one comprises plates 59 of piezoelectric material with external plate or metal foil electrodes 61, connected together to provide one terminal, and internal electrode 67 which provides the other terminal. Segmentation of the plates 59 or of the electrodes 61, 67 form no part of this invention and have not been shown in the figure. The piezoelectric element may advantageously be tuned to have its natural period of vibration the same as that of the liquid column 55. Above the upper electrode 61, a diaphragm 69 of rubber, plastic, or other suitable material may advantageously be placed to protect the crystal 59 from any injurious action of the liquid 55. Electrical energy may be drawn from these electrodes 61, 67 when the piezoelectric element is subjected to the oscillating pressures of the liquid column 55 and may be fed, for example, by way of a transformer 71, to any desired load 73. As before, in case it is desired to utilize direct current instead of alternating current, a rectifier 75 may be included in the circuit.

Modifications of the invention will occur to those skilled in the art. In particular it is within the scope of the invention to employ any suitable pressure-responsive, electricity-producing device to convert the energy of oscillation of the liquid column into electrical energy. Furthermore, the U tube of Fig. 1 may be constructed of standard pipe fittings.

What is claimed is:

1. A source of oscillatory energy which comprises a substantially vertical closed cylinder vessel having at its upper end a rigid plate and at its lower end a flexible plate, a mass of vaporizable liquid substantially filling said vessel, means for applying heat to said rigid plate so as to form bubbles of vapor at the upper surface of said liquid mass and impress an impulse on said liquid mass with a consequent relative movement of said upper surface, all tending to set up pressure waves in said mass, and cooling means positioned slightly below the upper level of said surface but close enough thereto to transmit a condenser action to said vapor only near the lower extreme of movement of said upper surface, whereby, when taken in connection with the condenser action at said surface by the return impulse after reflection from the flexible plate at the lower end of said vessel, a cyclical energization of said mass is promoted and perpetuated and energy may be produced by vibration of said flexible plate.

2. A source of oscillatory energy which comprises a substantially vertical closed cylindrical vessel having at its upper end a rigid plate and at its lower end a flexible plate, a mass of a vaporizable liquid substantially filling said vessel, means for applying heat to said liquid mass at one part thereof by application of heat to said rigid plate so as to form bubbles of vapor at the upper surface of said liquid mass and impress an impulse on said liquid mass with a consequent relative movement of said upper surface, all tending to set up pressure waves in said mass, and cooling means positioned slightly below the upper level of said surface but close enough thereto to transmit a condenser action to said vapor at approximately the lower extreme of movement of said upper surface, whereby, when taken in connection with the condenser action at said surface by the return impulse after reflection from the flexible plate at the lower end of said vessel, a cyclical energization of said mass is promoted and perpetuated and mechanical energy may be derived from the consequent vibration of said flexible plate.

3. A source of oscillatory energy which comprises a substantially vertical closed cylindrical vessel bounded at its upper end by a rigid plate and at its lower end by a flexible plate, a mass of a vaporizable liquid substantially filling said vessel, and means for causing intermittent vaporization of a part of said liquid mass by application of heat to said rigid plate, which intermittent vaporization sets up standing pressure waves in said mass of a wavelength substantially twice the length of said vessel, said means comprising a cooling means slightly below the upper surface of said vaporizable liquid but close enough thereto as to transmit a condenser action to said vapor at approximately the lower extreme of movement of said upper surface consequent on said vaporization and generation of pressure waves, whereby, when taken in connection with the condenser action at said upper surface by the return impulse after reflection from the flexible plate at the lower end of the vessel, said standing pressure waves are achieved and energy may be produced by vibration of said flexible plate.

4. A source of oscillatory energy which comprises a substantially vertical closed cylindrical vessel having at its upper end a rigid plate and at its lower end a flexible plate, a mass of a vaporizable liquid substantially filling said vessel, and means for causing intermittent vaporization of a part of said liquid mass at the upper surface thereof by application of heat to said rigid plate, which intermittent vaporization sets up pressure waves in said mass of a wavelength equal to an even multiple of the length of said vessel, said means comprising a cooling means slightly below the upper level of said surface but close enough thereto as to transmit a condenser action to said vapor at approximately the lower extreme of movement of said upper surface consequent on said vaporization and generation of pressure waves, whereby, when taken in connection with the condenser action at said upper surface by the return impulse after reflection from the flexible plate at the lower end of the vessel, said pressure waves are achieved and energy may be produced by vibration of said flexible plate.

5. A source of oscillatory energy which comprises a substantially vertical closed cylindrical vessel having at its upper end a rigid plate and at its lower end a flexible plate, a mass of a vaporizable liquid substantially filling said vessel, and means for causing intermittent vaporization of a part of said liquid mass at the upper surface thereof by application of heat to said rigid plate, which intermittent vaporization sets up pressure waves in said mass of a frequency determined by the dimensions of the vessel, said means comprising a cooling means slightly below the upper level of said surface but close enough thereto as to transmit the condenser action to said vapor at approximately the lower extreme of movement of said upper surface consequent on said vaporization and generation of pressure waves, whereby, when taken in connection with the condenser action at said upper surface by the return impulse after reflection from the flexible plate at the lower end of the vessel, said pressure waves are achieved and energy may be produced by vibration of said flexible plate.

RALPH V. L. HARTLEY.

REFERENCES CITED

The following references are of record in the file of this patent:

UNITED STATES PATENTS

| Number | Name | Date |
| --- | --- | --- |
| 1,213,611 | Fessenden | Jan. 23, 1917 |
| 1,218,233 | Welch | Mar. 6, 1917 |
| 1,481,270 | Purcell | Jan. 22, 1924 |
| 1,493,340 | Hahnemann et al. | May 6, 1924 |
| 1,510,476 | Hammond | Oct. 7, 1924 |
| 1,544,010 | Jordan | June 30, 1925 |
| 1,633,186 | Meissner | June 21, 1927 |
| 1,677,632 | Harden | July 17, 1928 |
| 2,094,621 | Savage | Oct. 5, 1937 |
| 2,111,036 | Wippel | Mar. 15, 1938 |
| 2,198,521 | Whitelegg | Apr. 23, 1940 |
| 2,215,895 | Wippel | Sept. 24, 1940 |
| 2,248,574 | Knight | July 8, 1941 |
| 2,259,858 | Reid | Oct. 21, 1941 |
| 2,355,618 | Bodine | Aug. 15, 1944 |
| 2,362,151 | Ostenberg | Nov. 7, 1944 |
| 2,389,067 | Lieberman | Nov. 13, 1945 |

FOREIGN PATENTS

| Number | Country | Date |
| --- | --- | --- |
| 176,838 | Great Britain | Mar. 6, 1922 |
| 188,642 | Great Britain | Nov. 29, 1933 |
| 424,955 | Great Britain | May 31, 1933 |
| 678,087 | France | Dec. 23, 1929 |